Feb. 10, 1953     L. J. WOLF     2,627,763
POWER TRANSMISSION
Filed Feb. 28, 1950
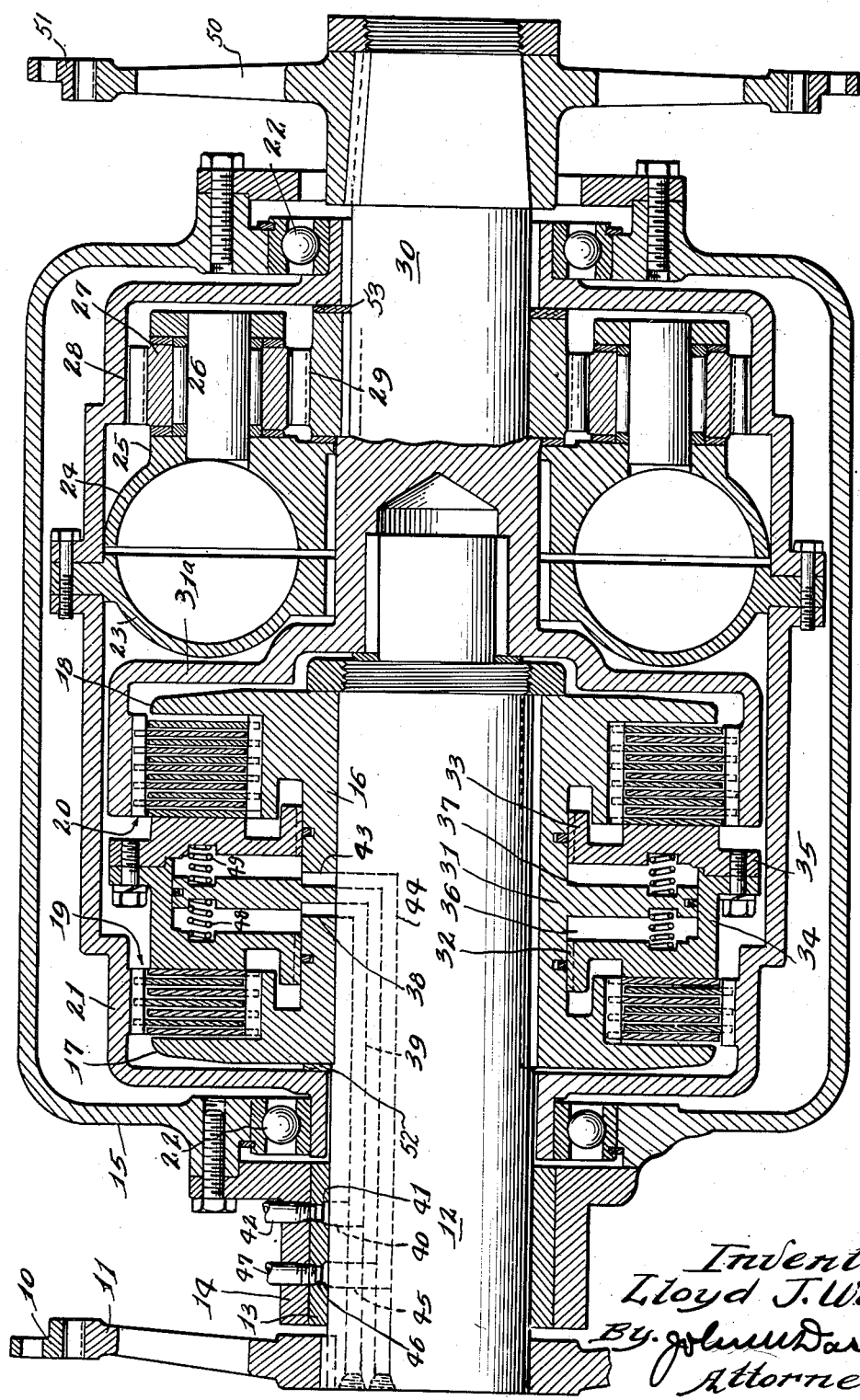
Inventor.
Lloyd J. Wolf.
By John M Darley
Attorney.

Patented Feb. 10, 1953

2,627,763

UNITED STATES PATENT OFFICE 2,627,763

POWER TRANSMISSION

Lloyd J. Wolf, Racine, Wis., assignor to Twin Disc Clutch Company, Racine, Wis., a corporation of Wisconsin Application February 28, 1950, Serial No. 146,664

6 Claims. (Cl. 74—688)

My invention relates to a variable speed power transmission and more particularly to an arrangement involving the cooperating action of an hydraulic coupling and a planetary gear train which enables the delivered horsepower and torque to be utilized over a more useful range than is possible with the coupling or gear train singly.

Where hydraulic couplings alone are employed as the power transmitting medium, it is well known that they are economical only where the torque to be applied to the driven shaft is fairly constant, or in other words, where the load applied to the driven member is substantially constant. Their efficiency decreases materially under conditions which set up a substantial difference in speed between the impeller and runner.

It is therefore one object of the invention to devise a transmission including an hydraulic coupling which provides infinitely variable output speeds while the power source operates at all times under optimum conditions with respect to fuel economy or current consumption and wear.

A further object is to provide a transmission incorporating an hydraulic coupling and a planetary gear train in which the latter controls the slip rate through the coupling to thereby avoid excessive heating of the working liquid in the coupling.

A further object is to devise a transmission having the foregoing characteristics in which the output shaft speed and torque automatically and instantaneously adjust to meet varying load conditions.

A further object is to provide a transmission of the character indicated having a pair of clutches selectively operable to provide initial drive through the coupling to reduce the starting shock load of a high speed input shaft to the driving member and to condition the transmission for direct drive by by-passing the coupling.

A further object is to devise a transmission as set forth having hydraulically actuated clutches in which the centrifugal head imposed on the actuating oil in the respective clutch cylinders is utilized to assist in the engaging and disengaging movements of the associated pistons.

A further object is to provide a transmission in which the clutches and coupling are enclosed in a casing that is filled with oil for the purpose of substantially eliminating the effect of thrust loads set up by the coupling.

These and further objects of the invention will be set forth in the following specification, reference being had to the accompanying drawing and the novel means by which said objects are effectuated will be definitely pointed out in the claims.

In the drawing, the figure shows a sectional elevation of the transmission with the clutches in neutral position.

Referring to the drawing, the numeral 10 designates an internally toothed, driving ring, intended for connection to a turbine, engine or motor (not shown), which is in constant mesh with a peripherally toothed, spider ring 11 that is keyed to an input shaft 12, the latter, by way of example, constituting the driving shaft of the transmission although the drive may be reversed through the unit as presently described. The shaft 12 is journaled in a sleeve bearing 13 carried by a collar 14 having a flanged end which is attached to the adjacent end of a housing 15 that encloses the transmission.

Within the housing 15, the input shaft 12 is keyed to a hub 16 having axially spaced, annular flanges 17 and 18 which serve as abutments, respectively, for the friction plates of hydraulically actuated, hydraulic and direct drive clutches 19 and 20. Alternate plates of the hydraulic drive clutch 19 are splinedly connected to the hub 16 and the intervening plates are similarly connected to the interior of a casing 21 which completely encloses the clutches, together with the hydraulic coupling and planetary gear train presently described, and is coaxial with the shaft 12. The ends of the casing 21 are journaled in bearings 22—22 carried by the respective, adjacent ends of the housing 15.

Drivably connected to the casing 21 is an impeller 23 which is operably related in the usual hydraulic coupling manner to a runner 24 that forms a part of a carrier 25. A plurality of stub shafts 26 are spaced around the carrier parallel to the shaft 12 and journaled on each shaft is a planet pinion 27 which meshes with a ring gear 28 integrally formed with the casing 21 and also with a sun gear 29 keyed to an output shaft 30 that extends outwardly of the housing 15 for connection with a load.

The opposite end of the output shaft is counterbored to pilotedly receive the adjacent end of the input shaft 12 and also may integrally include a cup-shaped member 31$^a$ which is positioned between the abutment flange 18 and the impeller 23. The annular wall of the member 31$^a$ has splined connection with alternate friction plates of the direct drive clutch 20 whose intervening plates have spline connection with the hub 16.

For the purpose of selectively actuating the clutches 19 and 20, the following instrumentalities are provided. A backing ring 31 is connected to and surrounds the hub in coaxial relation thereto, and is located between the adjacent end plates of the clutches. Connected, annular pistons 32 and 33 are positioned on opposite sides of the backing ring 31 and are keyed to and slidable on the hub 16, the piston 32 being located in operable relation to the adjacent plate of the clutch 19 and the piston 33 having a similar relation to the adjacent plate of the clutch 20. The piston 32 includes an annular wall 34 which is slidable on the periphery of the ring 31 and is secured to a flange 35 provided on the piston 33, the piston 32 and wall 34 being integrally formed preferably as a cup-shaped member while the piston 33 is generally ring shaped. From the foregoing, it will be apparent that the ring 31 defines with the hub 16 and piston 32 an annular cylinder 36 and with the hub 16 and piston 33 an annular cylinder 37. The cylinder 36 is supplied with actuating oil through a radial passage 38 in the hub 16 whose inner end communicates with one end of a longitudinal passage 39 in the shaft 12. The opposite end of the passage 39 connects with a radial passage 40 in the shaft 12 which in turn communicates with appropriate annular channels and radial passages in the bearing 13, generally designated by the numeral 41, with a supply pipe 42 which is connected to a source of oil pressure (not shown). Similarly, the cylinder 37 is supplied by a radial passage 43 in the hub 16 whose inner end connects with one end of a longitudinal passage 44 in the shaft 12. The opposite end of the passage 44 connects by way of a radial passage 45 in the shaft with suitable annular channels and radial passages in the bearing 13, generally indicated by the numeral 46, which in turn connect with a supply pipe 47 and thence with the oil pressure source. It is understood that flow of oil through the pipes 42 and 47 is selectively controlled by a suitable valve means (not shown), of which there are many types available in the prior art and which per se does not form any part of the invention. This valve means would also include a neutral position corresponding to a low supplied pressure on the oil in the cylinders 36 and 37, such as about five p. s. i., when the pistons 32 and 33 occupy the neutral positions shown. The cylinders are maintained full of oil at all times and engagement of either clutch is obtained by increasing the oil pressure in the associated cylinder. A suggested method of controlling the oil in this manner is disclosed and claimed in U. S. Letters Patent #2,464,538, dated March 15, 1949. Springs 48 and 49, interposed between the ring 31 and the pistons 32 and 33, respectively, tend to maintain the pistons in the neutral position.

In describing the operation of the transmission, it will be assumed that the clutches 19 and 20 are in the neutral positions shown and that the power source connected to the shaft 12 is operating. Since the cylinders 36 and 37 are filled with oil under low pressure, the centrifugal heads imposed on this oil are constantly balanced so that the pistons 32 and 33 remain in the positions indicated.

To reduce starting shock load, it is preferable to initially connect the shafts 12 and 30 through the hydraulic coupling, and to accomplish this result, the oil pressure is increased in the cylinder 36 to thereby shift the piston 32 towards the left and engage the hydraulic drive clutch 19. The power flow to the output shaft 30 is then transmitted mechanically through the casing 21, ring gear 26, planet pinions 27 and sun gear 29, also hydraulically through the casing 21, impeller 23, runner 24, planet pinions 27 and sun gear 29.

So long as the clutch 19 is engaged, the rotational speed of the output shaft 30 is controlled by the load imposed thereon and the interaction between the components of the planetary gear train arising from the cooperative action of the mechanical and hydraulic drives in the transmission. The variation in the output speed ranges from zero, which is a stalled position of the shaft 30, to a substantially one to one ratio with the input speed and throughout this range the available horsepower remains constant, thus permitting operation of the power source under optimum conditions. Due to the flexible characteristics of the transmission arising from the ability of the coupling and gear train components to respectively rotate relative to each other, the output speed and torque automatically and instantaneously adjust to varying load conditions. Hence, the torque and delivered horsepower are spread over a much more useful range than is possible with either the coupling or gear train alone.

A further advantage of the transmission during hydraulic drive is that the gear train controls the amount of slip in the coupling throughout the working range of the transmission, including maximum slip which occurs when the output shaft 30 is stalled. Under the latter condition, the sun gear 29 is stationary and the pinion carrier 25 and the connected runner 24 is driven by the ring gear 26. The relative slip of the runner is therefore controlled by the gear ratio of the gear train so that heating of the coupling liquid never exceeds that which can be adequately cooled.

During hydraulic drive, the adaptability of the transmission is due to the connected relation of the coupling and the planetary gear train whereby all elements of the latter are free to rotate at all times, except under stall conditions, this rotational freedom being particularly advantageous in reducing shock loading during starting. The transmission is therefore highly flexible in operation and is able to efficiently handle varying load conditions in respect of output speed and torque. By varying the relations of the gear train components to the coupling, power flow through the unit can be accommodated to varying torque requirements. The transmission is particularly useful where a quick pick-up of the load is desired, such as where the associated machine load is designed for repetitive, short working cycles and capacity is required for rapid acceleration.

If the output shaft 30 is brought up to a speed where the transmission can be conditioned for direct drive without undue shock, actuating pressure is released in the cylinder 36 and established in the cylinder 37, whereby releasing the clutch 19 and engaging the clutch 20 to transmit drive directly to the output shaft 30. Under these conditions, the casing 21 and connected parts rotate freely in the bearings 22—22 due to the impulse of the sun gear 29 so that the hydraulic coupling does not exert any drag during direct drive.

The output shaft 30 may be connected to the load through meshing spider and driven rings 50 and 51 corresponding to the rings 11 and 10, all respectively, or the transmission may be driven through the rings 48 and 49 without disturbing the characterisics of the unit. In the latter case, the shaft 30 would act as an input shaft.

Connecting the pistons 32 and 33 is an important feature of the invention since it prevents the centrifugal head on the oil in the cylinder of the released piston from inadvertently moving the latter to a position of engagement. Further, the floating relation of the connected pistons to the backing ring 31 provides certain economies in manufacture and weight reduction since the pistons provide the end and the outer walls of the annular cylinders 36 and 37.

For the purpose of reducing to a substantial extent the effect of thrust loads set up by the impeller 23 and runner 24, the casing 21, is completely filled with oil of the type employed in the coupling. This oil is retained by packing rings 52 and 53 interposed respectively between the end walls of the casing 21 and the adjacent ends of the hub 16 and sun gear 29.

I claim:

1. A power transmission comprising aligned first and second shafts, an hydraulic coupling having an impeller and a runner, planetary gear means including a plurality of coacting gear elements, one of the elements being connected to the impeller, another element being connected to the runner and another element being connected to the second shaft, first and second clutches selectively engageable to connect the first shaft to the impeller for hydraulic drive and the first shaft to the second shaft for direct drive, respectively, and hydraulically actuated piston means for determining the engagement of each clutch, the piston means being connected for simultaneous movement and each piston means being constantly subjected to a basic minimum pressure.

2. A power transmission comprising aligned first and second shafts, an hydraulic coupling having an impeller and a runner, planetary gear means including a ring gear connected to the impeller, a sun gear connected to the second shaft and a carrier mounted on the runner and having a plurality of planet pinions meshing with the ring and sun gears, and first and second clutches selectively engageable to connect the first shaft to the impeller for hydraulic drive and the first shaft to the second shaft for direct drive, respectively.

3. A power transmission comprising a housing, aligned first and second shafts positioned within the housing, an hydraulic coupling having an impeller and a runner, planetary gear means including a plurality of coacting gear elements, one of the elements being connected to the impeller, another element being connected to the runner and another element being connected to the second shaft, first and second clutches selectively engageable to connect the first shaft to the impeller for hydraulic drive and the first shaft to the second shaft for direct drive, respectively, and a casing journaled in the housing in enclosing relation to both clutches and liquid filled to reduce thrust loads of the coupling, the coupling and the planetary gear means, the first clutch, the impeller and said one gear element being connected to the casing.

4. A power transmission comprising a housing, aligned first and second shafts positioned within the housing, an hydraulic coupling having an impeller and a runner, planetary gear means including a ring gear connected to the impeller, a sun gear mounted on the second shaft and a carrier connected to the runner and having a plurality of planet pinions meshing with the ring and sun gears, first and second clutches selectively engageable to connect the first shaft to the impeller for hydraulic drive and the first shaft to the second shaft for direct drive, respectively, and a casing journaled in the housing in enclosing relation to both clutches and liquid filled to reduce thrust loads of the coupling, the coupling and the planetary gear means, and the first clutch, the impeller and the ring gear being connected to the casing.

5. A power transmission comprising aligned first and second shafts, an hydraulic coupling having an impeller and a runner, planetary gear means including a plurality of coacting gear elements, one of the elements being connected to the impeller, another element being connected to the runner and another element being connected to the second shaft, a hub keyed to the first shaft, an annular backing ring connected to the hub, first and second annular pistons splined to the hub on opposite sides of the backing ring, one of the pistons including an annular wall slidably related to the periphery of the backing ring and connected to the other piston, the pistons, backing ring and hub defining first and second cylinders for receiving actuating fluid to selectively move either piston away from the backing ring, and first and second clutches respectively connectible to the impeller and second shaft and respectively engaged by the first and second pistons.

6. A power transmission comprising a housing, aligned first and second shafts positioned within the housing, an hydraulic coupling having an impeller and a runner, planetary gear means including a plurality of coacting gear elements, one of the elements being connected to the impeller, another element being connected to the runner and another element being connected to the second shaft, a hub having an annular abutment flange at each end thereof keyed to the first shaft, an annular backing ring connected to the hub between the flanges, first and second, annular pistons splined to the hub on opposite sides of the backing ring, one of the pistons including an annular wall slidably related to the periphery of the backing ring and connected to the other piston, the pistons, backing ring and hub defining first and second cylinders for receiving actuating fluid to selectively move either piston away from the backing ring, a casing journaled in the housing in enclosing relation to the hub, the coupling and the planetary gear means, the impeller and said one gear element being connected to the casing, a first clutch positioned between the first piston and adjacent abutment flange and including a plurality of friction plates, alternate plates being connected to the hub and intervening plates to the casing, and a second clutch positioned between the second piston and adjacent abutment flange and including a plurality of friction plates, alternate plates being connected to the hub and intervening plates to the second shaft, the pistons being selectively operable to engage either clutch.

LLOYD J. WOLF.

REFERENCES CITED

The following references are of record in the file of this patent:

UNITED STATES PATENTS

| Number | Name | Date |
|---|---|---|
| 2,102,634 | Lysholm | Dec. 21, 1937 |
| 2,226,802 | Black | Dec. 31, 1940 |
| 2,353,905 | Kelley | July 18, 1944 |
| 2,397,368 | Pennington | Mar. 26, 1946 |
| 2,420,914 | Schjolin | May 20, 1947 |
| 2,494,466 | Wolf | Jan. 10, 1950 |